United States Patent
Smith et al.

(10) Patent No.: US 6,488,460 B1
(45) Date of Patent: Dec. 3, 2002

(54) COMPOSITE PANEL INSERT WITH HOLD OUT RECESS FEATURE

(75) Inventors: Andrew D. Smith, Arlington, TX (US); Kendall F. Goodman, Carrollton, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 09/561,652

(22) Filed: May 2, 2000

(51) Int. Cl.[7] ............................................. F16B 21/18
(52) U.S. Cl. ...................... 411/353; 411/339; 411/999; 52/364
(58) Field of Search ................................ 411/338, 339, 411/353, 999, 508, 546

(56) References Cited

U.S. PATENT DOCUMENTS

| | | | |
|---|---|---|---|
| 1,409,606 A | * 3/1922 | Stendahl | |
| 2,700,172 A | 1/1955 | Rohe | ............................ 16/2 |
| 2,761,484 A | * 9/1956 | Sternick | |
| 2,957,196 A | 10/1960 | Kreider et al. | ................... 16/2 |
| 3,556,570 A | * 1/1971 | Cosenza | |
| 3,678,535 A | 7/1972 | Charles | ........................... 16/2 |
| 3,771,410 A | * 11/1973 | Swindt | |
| 4,112,993 A | 9/1978 | Dey | ....................... 151/41.74 |
| 4,296,586 A | 10/1981 | Heurteux | .................... 52/787 |
| 4,464,090 A | * 8/1984 | Duran | |
| 4,761,860 A | 8/1988 | Krauss | ......................... 24/142 |
| 4,828,442 A | * 5/1989 | Duran | |
| 5,069,586 A | 12/1991 | Casey | .......................... 411/339 |
| 5,093,957 A | 3/1992 | Do | .................................. 16/2 |
| 5,147,167 A | 9/1992 | Berecz et al. | ................. 411/44 |
| 6,264,412 B1 | * 7/2001 | Nakamura | .................. 411/352 |

* cited by examiner

*Primary Examiner*—Flemming Saether
(74) *Attorney, Agent, or Firm*—James E. Walton; Hill & Hunn, LLP

(57) ABSTRACT

A panel insert for use with a structural panel and a fastener having a hold out mechanism. The panel insert comprises a body portion disposed within the structural panel. The body portion includes a first surface, an opposing second surface, and an aperture passing therethrough for receiving the fastener. A recessed portion opening to the second surface is provided to receive the hold out mechanism and secure the fastener to the structural panel.

5 Claims, 2 Drawing Sheets

US 6,488,460 B1

COMPOSITE PANEL INSERT WITH HOLD OUT RECESS FEATURE

BACKGROUND ART

1. Field of the Invention

The present invention relates generally to panel inserts for use with structural panels and fasteners having hold out mechanisms. In particular, the present invention relates to panel inserts for use with fasteners having hold out features.

2. Description of Related Art

Grommet inserts, also referred to as panel inserts, for fastening structural panels and composite sandwich panels together are well known in the art. These panel inserts are used in a wide variety of applications, most often as a strengthening means through which a fastener, bolt, or stud nut may be passed to couple other structures to a composite panel. In most cases, these panel inserts are formed by coupling two or more pieces together, usually a male piece and a female piece, through an aperture in the composite panel. There are many different ways to couple the pieces together and prevent them from exerting too much force on the panel, including: press fitting one portion into another, ratcheting one portion into another, receiving the lip of one piece with a groove on the other piece, deformation of one piece by the other piece, and so on. Some of these panel inserts include a counter bore to receive a flush head bolt or stud nut.

Panel inserts generally come in two types: "protruding," which have flanges that protrude beyond the opposing surfaces of the panels, and "flush," which have flanges that are flush with one or both of the opposing exterior surfaces of the panel. Flush panel inserts usually involve some inward deformation of the panel surfaces near the aperture that passes through the panel. Although protruding panel inserts do not require any deformation of the panel, the flanges of the protruding panel insert often get in the way when panels or parts are being assembled or disassembled, particularly when bolts or stud nuts passing through the grommet also protrude beyond the surfaces of the panel. On the other hand, because the flanges of flush panel inserts are flush with one or more of the opposing surfaces of the panel, the panels assemble and disassemble easier and faster, with less opportunity for incidental damage from handling.

The primary purpose of these grommet panel inserts is to strengthen the panel at aperture through which the fastener, bolt, or stud nut passes.

Although these flush panel inserts may be installed flush with the exterior surfaces of the structural or composite panel, they do not adequately provide for flushly mounting fasteners having hold out mechanisms.

BRIEF SUMMARY OF THE INVENTION

There is a need for a composite panel insert having a recess to receive a hold out mechanism of a fastener or stud nut, whereby the hold out mechanism and the stud nut are flush with a surface of the composite panel when the stud nut is in a hold out position.

It is an object of the present invention to provide a composite panel insert having a recess to receive a hold out mechanism of a fastener or stud nut, whereby the hold out mechanism and the stud nut are flush with a surface of the composite panel when the stud nut is in a hold out position.

A principle advantage of the present invention is that when the hold out mechanism and the stud nut are flush, or sub-flush, with the interior surface of the composite panel, i.e., the surface of the panel that mates with another structural component, ease and speed of assembling and disassembling other parts and panels to the composite panel is greatly improved. Another advantage of the present invention is that incidental damage from handling to the composite panel and other parts and panels is reduced because fewer studs and nuts protrude out from the exterior surface of the composite panel.

The above, as well as, additional objects, features, and advantages of the present invention will become apparent in the following detailed description.

DETAILED DESCRIPTION OF THE PREFERRED EMBODIMENT

Figure 1:
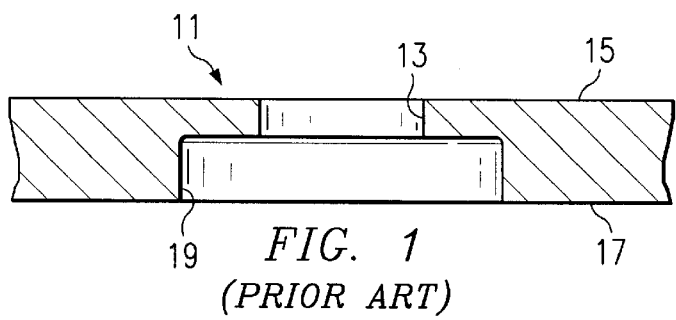
FIG. 1 is a cross-sectional view of a portion of a prior-art panel having a passage through which a protruding flat head stud nut may pass, the passage including a recess to receive a hold out mechanism of the stud nut.

Referring to FIG. 1 of the drawings, numeral 11 illustrates a prior-art panel having an aperture 13 passing therethrough. Panel 11 is typically made of a rigid material such as aluminum or other metallic material, but panel 11 may be made of a plastic or composite material. Panel 11 is generally not representative of panels having honeycomb construction. For purposes of the present invention, panel 11 may represent either a single panel or a plurality of panels connected in layers together. Aperture 13 is usually annular in shape and passes through panel 11 from a first surface 15 to an opposing second surface 17. Aperture 13 allows a fastener, such as a bolt or stud nut (see FIG. 2) to pass through panel 11 and secure panel 11 to another panel or structure (not shown). A recessed area 19 is machined into panel 11 from second surface 17. Recessed area 19 has a larger diameter than aperture 13. Recessed area 19 is usually annular in shape and concentric with aperture 13. Recessed area 19 receives a hold out cage (see FIG. 2) of the bolt or stud nut. Because panel 11 has no counter bore on first surface 15, panel 11 would only be suited for protruding head fasteners.

Figure 2:
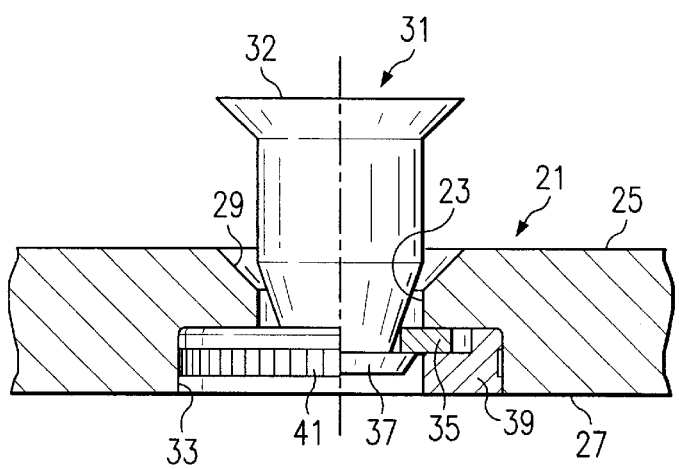
FIG. 2 is a cross-sectional view of a portion of a prior-art panel having a passage through which a flush head stud nut may pass, the passage including a recess to receive a hold out mechanism of a stud nut. A flush head stud nut having a hold out mechanism, is shown in the passage in a hold out position.

Referring now to FIG. 2 in the drawings, a prior-art panel 21, similar to panel 11, is illustrated. An aperture 23 passes through panel 21. As with panel 11, panel 21 is typically made of a rigid material such as aluminum or other metallic material, but panel 21 may be made of a plastic or composite material. Panel 21 may be either a single panel or a plurality of panels layered together. As with panel 11, panel 21 generally does not represent panels of honeycomb construction. Aperture 23 is usually annular in shape and passes through panel 21 from a first surface 25 to an opposing second surface 27. Aperture 23 includes a counter bore 29 bored into panel 21 from first surface 25. Aperture 23 and counter bore 29 allow a conventional flush head fastener, such as stud nut 31 to pass through panel 21 and secure panel 21 to another panel or structure (not shown). Stud nut 31 has a flush mount head 32 that is received into counter bore 29, thereby allowing stud nut 31 to be flush with first surface 25 when in a fastened position. In FIG. 2, stud nut 31 is shown in an unfastened hold out position. A recessed area 33 is machined into panel 21 from second surface 27. Recessed area 33 has a larger diameter than aperture 23. Recessed area 33 is usually annular in shape and concentric with aperture 23.

In a typical installation, stud nut 31 is installed through aperture 23. A retaining ring 35 having an outside diameter larger than the diameter of aperture 23 is then installed through recessed area 33 and around a base portion 37 of stud nut 31 to prevent stud nut 31 from falling out of aperture 23. An ring-shaped hold out cage 39 (shown in partial cross section) having an inside diameter smaller than the outside diameter of retaining ring 35 is then inserted into recessed area 33 and held in place by a press fit between the inside surface of recessed area 33 and a knurled exterior surface 41 of hold out cage 39. The thickness of hold out cage 39 is dimensioned such that after insertion into recessed area 33, hold out cage 39 remains flush with second surface 27 of panel 21. Thus, when stud nut 31 is in the unfastened position, as shown in FIG. 2, stud nut 31 is held in place by retaining ring 35, which, in turn, is held in place by hold out cage 39. In this manner, stud nut 31 is retained in a flush, or sub-flush position relative to second surface 27. This arrangement makes it faster and easier to assemble and disassemble panel 21 with other panels and structures. During assembly, stud nut 31 is firmly held in place and is ready to be fastened without additional alignment. In addition, incidental damage due to handling is reduced because stud nut 31 does not extend beyond surface 27 when in the unfastened position.

Figure 3:
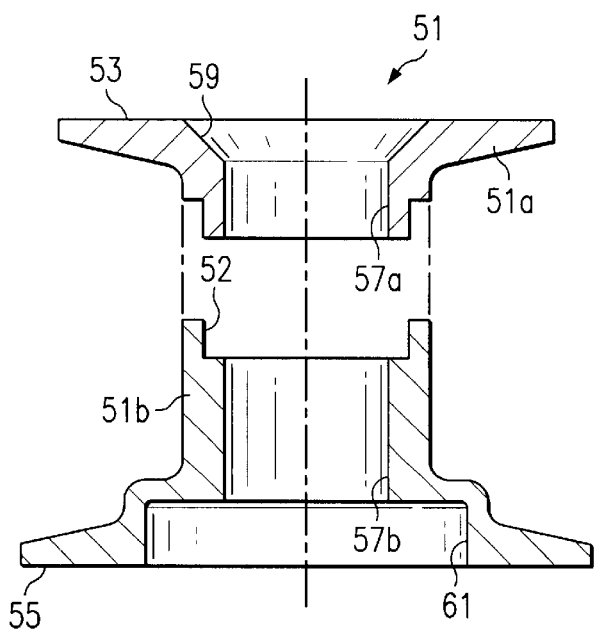
FIG. 3 is an exploded cross-sectional view of the panel insert with hold out recess feature according to the present invention.
Figure 4:
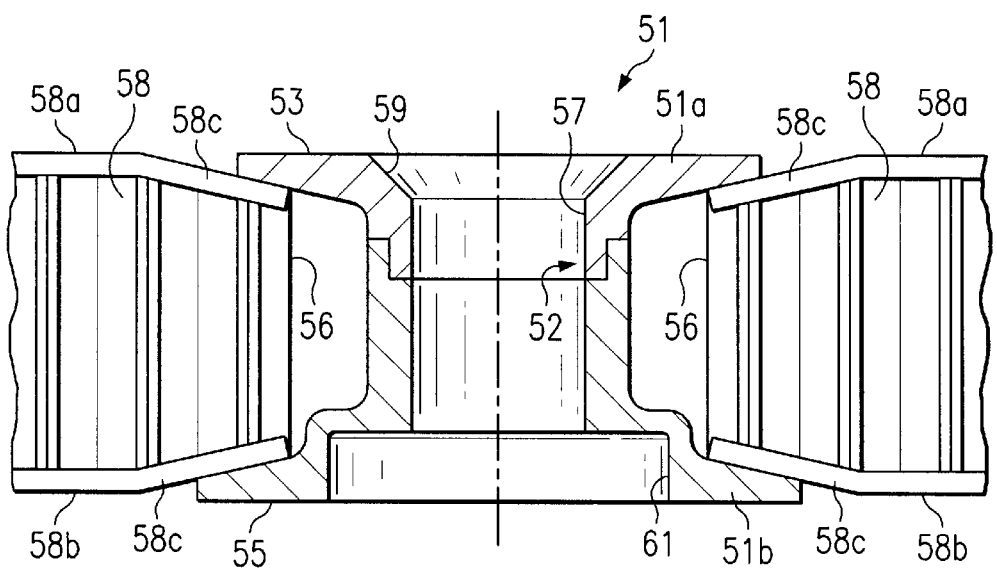
FIG. 4 is an assembled cross-sectional view of the panel insert of FIG. 3 shown installed in a composite panel.

Referring now to FIGS. 3 and 4 in the drawings, the preferred embodiment of a composite panel insert with hold out recess feature according to the present invention is illustrated. As shown in FIG. 3, a rigid insert 51 includes body portion comprised of a plug portion 51a and a sleeve portion 51b that is received by plug portion 51a. Plug portion 51a and sleeve portion 51b are preferably made of a rigid material, such as aluminum or other metallic material; however, plug portion 51a and sleeve portion 51b may also be made of a composite material. Plug portion 51a includes a first surface 53, and sleeve portion 51b includes an opposing second surface 55. Plug portion 51a and sleeve portion 51b are press fit together at a joint 52, but my be coupled together by other means, such as threads, a snap fit, a ratchet fit, or other conventional means. Because insert 51 is rigid, it may be used with both rigid panels, including metallic and composite panels, and non-rigid panels, including panels made of honeycomb construction. As shown in FIG. 4, insert 51 is installed through an aperture 56 in a composite honeycomb panel 58. Panel 58 may also be one or more composite sandwich plates. Panel 58 has a first exterior surface 58a and an opposing second exterior surface 58b. Edges 58c surrounding aperture 56 are deformed inwardly to allow a flush mount between first surface 53 and first exterior surface 58a, and between second surface 55 and second exterior surface 58b. An aperture 57a passes longitudinally through plug portion 51a. Likewise, an aperture 57b passes longitudinally through sleeve portion 51b.

Figure 5:
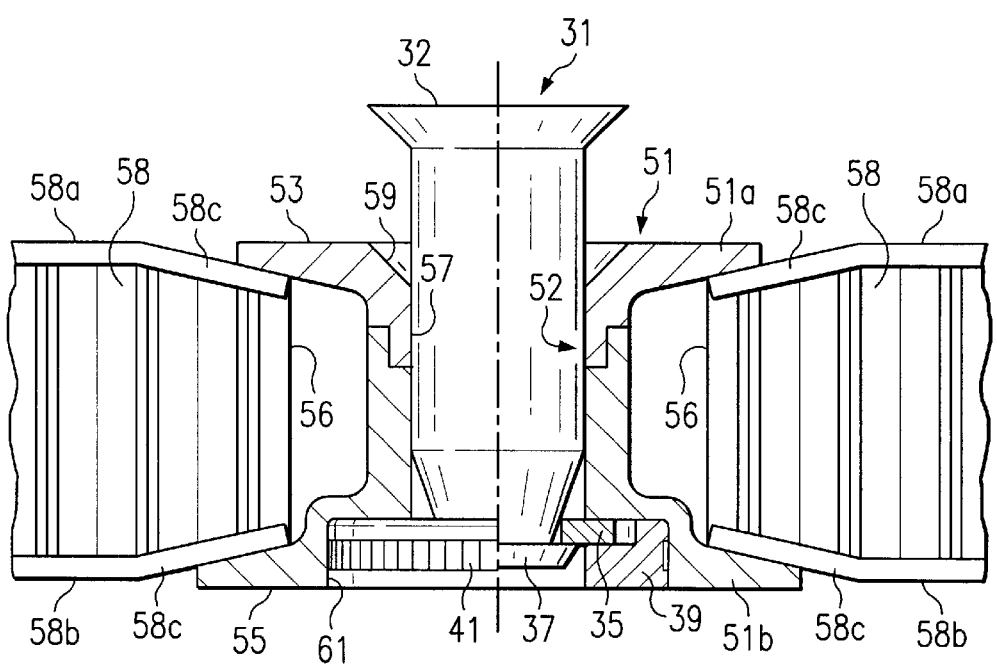
FIG. 5 is an assembled cross-sectional view of the panel inset of FIG. 3 shown installed in a composite panel with a hold-out fastener.

As shown in FIGS. 4 and 5, upon coupling of plug portion 51 a and sleeve portion 51b, apertures 57a and 57b combine and align to form a single aperture 57. Plug portion 51a includes a counter bore 59 to receive a flush head bolt or stud nut, Marked-Up and Clean Versions of Amended Paragraphs in the Specification such as stud nut 31. It should be understood that counter bore 59 is not necessary. In the case where plug portion 51a does not have counter bore 59, insert 51 would be better suited for a flat head fastener. Sleeve portion 51b includes a recessed portion 61. Recessed portion 61 is very similar in form and function to recessed areas 19 and 33 which are machined into panels 11 and 21, respectively. As such, after insert 51 is assembled by coupling plug portion 51a to sleeve portion 51b, through aperture 56 of panel 58, a fastener, such as stud nut 31 may be installed and secured in place within recessed portion 61 as described above with respect to FIG. 2. Such plug 51a and sleeve 51b combination provides added strength to panel 58 at aperture 56. Without some type of insert or grommet, panel 58 would not be able to adequately support a fastener through aperture 56, and without insert 51, panel 58 would not be able to flushly receive stud nut 31 having hold out cage 39. Plug portion 51a and sleeve portion 51b are preferably installed in aperture 56 of panel 58 with a conventional adhesive, such as epoxy.

It should be understood that plug portion 51a and sleeve portion 51b may be interchanged, such that sleeve portion 51b inserts into plug portion 51a. In other words, it is not necessary that counter bore 59, if present, be in plug portion 51a, and that recessed portion 61 be in sleeve portion 51b. In addition, insert 51 may be of unitary construction, or may be comprised of more than two portions, depending on the particular application. It is only necessary that recessed portion 61 is available to receive the hold out cage of a bolt or stud nut, such as hold out cage 39 of stud nut 31.

As with the rigid panels of FIGS. 1 and 2, when stud nut 31 is installed into insert 51, stud nut 31 is held in place by retaining ring 35, which, in turn, is held in place by hold out cage 39. In this manner, stud nut 31 is retained in a flush, or sub-flush, position relative to second exterior surface 58b. This arrangement makes it faster and easier to assemble and disassemble panel 58 with other panels and structures. During assembly, stud nut 31 is firmly held in place and is ready to be fastened without additional alignment. In addition, incidental damage due to handling is reduced because stud nut 31 does not extend beyond surface second exterior surface 58b when in the unfastened position. Insert 51 allows for close fit of mating components without potential interference from fasteners protruding beyond second exterior surface 58b. By using insert 51 it is not necessary to provide additional strengthening features to composite panel 58, such as embedding metal plates for future machining in panel 58. Insert 51 adds strength to panel 58 without adding additional weight or cost.

It should be apparent from the foregoing that an invention having significant advantages has been provided. While the invention is shown in only one of its forms, it is not just limited but is susceptible to various changes and modifications without departing from the spirit thereof.

I claim:
1. A combination panel insert, fastener having a hold out mechanism, and honeycomb composite structural panel, the combination panel insert, fastener, and structural panel comprising:
    a honeycomb composite structural panel;
    a fastener having a hold out mechanism having a retaining ring and a hold out cage; and a panel insert comprising:
- a body portion adapted to be disposed within the structural panel, the body portion including a first surface, an opposing second surface, and an aperture passing therethrough for receiving the fastener; and
- a recessed portion opening to the second surface, the recessed portion receiving the hold out mechanism;
- wherein the body portion is configured such that the honeycomb composite structural panel is compressed inwardly upon installation of the panel insert;

wherein the first surface and the second surface, including the hold out mechanism, are flush with the opposing exterior surfaces of the honeycomb composite structural panel.

2. The combination panel insert, fastener, and structural panel according to claim 1, wherein the body portion comprises:
- a plug portion having a plug aperture; and
- a sleeve portion coupled to the plug portion, the sleeve portion having a sleeve aperture;
- the plug portion and the sleeve portion being coupled such that the plug aperture is aligned with the sleeve aperture, thereby forming the aperture that passes through the body portion;
- the recessed portion being disposed within the sleeve portion.

3. The combination panel insert, fastener, and structural panel according to claim 1, wherein the body portion includes a counter bore opening to the first surface, the counter bore opening being adapted for flushly receiving a flush head of the fastener.

4. A composite panel grommet assembly comprising:

composite panel having a first surface, a second surface, and a panel aperture passing through the composite panel from the first surface to the second surface;

a fastener having a hold out mechanism and a flush head, the hold out mechanism having a retaining ring and a hold out cage;

a grommet disposed within the aperture, the grommet comprising:
- a plug portion;
- a sleeve portion coupled to the plug portion;
- a passage that passes through the plug portion and the sleeve portion;
- a counter bore disposed in the plug portion, the counter bore opening to the first surface and flushly receiving the flush head of the fastener; and
- a recessed portion disposed in the sleeve portion, the recessed portion opening to the second surface and flushly receiving the hold out mechanism of the fastener;

wherein both the first surface and the second surface are inwardly compressed adjacent the aperture, such that the plug portion is flush with the first surface and the sleeve portion and the hold out mechanism are flush with the second surface.

5. The composite panel grommet assembly according to claim 4, wherein the composite panel is a honeycomb composite panel.

* * * * *

UNITED STATES PATENT AND TRADEMARK OFFICE
CERTIFICATE OF CORRECTION

PATENT NO.   : 6,488,460 B1
DATED        : December 3, 2002
INVENTOR(S)  : Smith et al.

It is certified that error appears in the above-identified patent and that said Letters Patent is hereby corrected as shown below:

<u>Title page,</u>
Item [75], Inventors, change the name of the second inventor to -- Kendall E. Goodman --.

Signed and Sealed this

Twenty-ninth Day of April, 2003

JAMES E. ROGAN
*Director of the United States Patent and Trademark Office*